United States Patent
Passler (10) Patent No.: US 9,693,187 B2
(45) Date of Patent: Jun. 27, 2017

(54) GEO-LOCATION OF A WLAN DEVICE

(71) Applicant: SR Technologies, Inc., Davie, FL (US)

(72) Inventor: Mark Passler, Boca Raton, FL (US)

(73) Assignee: SR TECHNOLOGIES, INC., Davie, FL (US)

( * ) Notice: Subject to any disclaimer, the term of this patent is extended or adjusted under 35 U.S.C. 154(b) by 0 days.

(21) Appl. No.: 14/847,707

(22) Filed: Sep. 8, 2015

(65) Prior Publication Data

US 2016/0277880 A1    Sep. 22, 2016

Related U.S. Application Data

(60) Provisional application No. 62/133,746, filed on Mar. 16, 2015.

(51) Int. Cl.
| | |
|---|---|
| H04W 4/02 | (2009.01) |
| H04W 64/00 | (2009.01) |
| G01S 5/00 | (2006.01) |
| H04W 84/12 | (2009.01) |

(52) U.S. Cl.
CPC .............. *H04W 4/02* (2013.01); *G01S 5/00* (2013.01); *H04W 64/00* (2013.01); *H04W 84/12* (2013.01)

(58) Field of Classification Search
CPC . G01S 5/06; G01S 5/14; G01S 5/0242; G01S 19/48; G01S 5/10; G01S 19/11; G01S 3/14; G01S 5/0009; G01S 5/0294; G01S 5/0257; G01S 13/876; G01S 19/07; G01S 13/878; G01S 5/0054; G01S 5/0081; G01S 5/009; G01S 5/0263; G01S 5/0268; H01Q 1/125; H04W 64/00; H04W 64/003; H04W 64/006; H04W 4/021; H04M 2242/30

See application file for complete search history.

(56) References Cited

U.S. PATENT DOCUMENTS

| | | | |
|---|---|---|---|
| 2008/0158059 A1* | 7/2008 | Bull | G01S 5/06 342/387 |
| 2014/0113547 A1* | 4/2014 | Kwak | H04W 8/005 455/39 |

\* cited by examiner

*Primary Examiner* — Nizar Sivji
(74) *Attorney, Agent, or Firm* — Christopher & Weisberg, P.A.

(57) ABSTRACT

A passive geo-location method for determining the location of a wireless device. The method includes receiving, by a measuring receiver at a first position, a first beacon transmitted to the measuring receiver by the wireless device, and receiving, by the measuring receiver at a second position, a second beacon transmitted to the measuring receiver by the wireless device. When the first position differs from the second position by less than a predetermined distance, the method further includes determining a relative drift between a clock associated with the wireless device and a clock associated with the measuring receiver, and determining a location of the wireless device based at least on the determined relative drift.

17 Claims, 6 Drawing Sheets

GEO-LOCATION OF A WLAN DEVICE

CROSS-REFERENCE TO RELATED APPLICATION

This application is related to and claims priority to U.S. Provisional Patent Application Ser. No. 62/133,746, filed Mar. 16, 2015, entitled "GEO-LOCATION OF A WLAN DEVICE", the entirety of which is incorporated herein by reference.

STATEMENT REGARDING FEDERALLY SPONSORED RESEARCH OR DEVELOPMENT n/a

TECHNICAL FIELD

The present disclosure relates to a method and system for geo-location of wireless devices and in particular to the geo-location of wireless local area network (WLAN) devices.

BACKGROUND

The location of WLAN devices can be performed by various means. Of particular interest for this disclosure is the location of devices that are based upon the Institute of Electrical and Electronics Engineers (IEEE 802.11) technology, commonly known as Wi-Fi. Various methods can be used to locate an access point (AP), or a station (STA). These methods may be classified as active, passive and combined active and passive. In an active location scheme, a device that is determining the location or range, the measuring device, transmits certain packets to the device being located, the target device, and the common method is to measure the time of arrival (TOA) of the response from the target device and compare that to the time of departure (TOD) that the packet was transmitted by the measuring device. In a passive location scheme, a measuring device simply monitors the TOAs of non-stimulated transmissions from the target device.

In such location systems it is common to use multiple measuring devices to determine the location. In such a scheme simultaneous TOA and/or TOD measurements are taken by different measuring devices situated at different points and from these measurements the location of the target device is calculated. For example, in a passive location scheme, the TOA of a transmission from the target may be simultaneously received at several sites. The difference in the TOAs between two sites is known as the time difference of arrival (TDOA). The TDOA is related to the difference in path lengths between the target and each receiving site, and for each pair of receivers the TDOA results in a hyperbola along which the location of the target lies. The addition of a third site will provide a second hyperbola and the location of the target will be indicated by the interception of the two hyperbolas.

SUMMARY

The present disclosure advantageously provides a method and system for geo-location of wireless devices. In one aspect of the disclosure, the method includes receiving, by a measuring receiver at a first position, a first beacon transmitted to the measuring receiver by the wireless device, and receiving, by the measuring receiver at a second position, a second beacon transmitted to the measuring receiver by the wireless device. When the first position differs from the second position by less than a predetermined distance, a relative drift is determined between a clock associated with the wireless device and a clock associated with the measuring receiver, and a location of the wireless device is determined based in part on the determined relative drift.

In another aspect of the disclosure, a measuring receiver for determining a location of a wireless device is provided. The measuring receiver includes an interface configured to receive, at a first position, a first beacon transmitted to the measuring receiver by the wireless device, and receive, at a second position, a second beacon transmitted to the measuring receiver by the wireless device. The measuring receiver also includes a processor, and a memory configured to store instructions that, when executed, configure the processor to, when the first position differs from the second position by less than a predetermined distance, determine a relative drift between a clock associated with the wireless device and a clock associated with the measuring receiver, and determine a location of the wireless device based in part on the determined relative drift.

In accordance with still another aspect, the disclosure provides a method for determining a location of a wireless device. The method provides receiving, by a measuring receiver, a first beacon, the first beacon including a first timer synchronization function (TSF) field containing a first Time of Departure (TOD), the first TOD indicating when the wireless device transmitted the first beacon to the measuring receiver according to a clock associated with the wireless device. A first position of the measuring receiver at a time the first beacon was received is identified. A first Time of Arrival (TOA) of the first beacon at the measuring receiver according to a clock associated with the measuring receiver is identified. The measuring receiver receives a second beacon in which the second beacon includes a second TSF field containing a second TOD. The second TOD indicates when the wireless device transmitted the second beacon to the measuring receiver according to the clock associated with the wireless device. A second position of the measuring receiver at a time the second beacon was received is identified. A second TOA of the second beacon at the measuring receiver according to the clock associated with the measuring receiver is identified. When the second position differs from the first position by less than a predetermined distance, a relative drift between the clock associated with the wireless device and the clock associated with the measuring receiver is determined, and a location of the wireless device based in part on the determined relative drift is determined.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

In one embodiment of the present disclosure, a single measuring device is used in a passive mode to locate a target, such as a wireless device, where the device is a device based upon IEEE 802.11 technology, commonly known as Wi-Fi.

A method is proposed that determines the location of a target transmitting device, in a passive manner, using a single mobile measuring station. In one embodiment, the target device is an access point conforming to the IEEE 802.11 standard and the measuring station may also be a device that conforms to the IEEE 802.11 standard.

Figure 1:
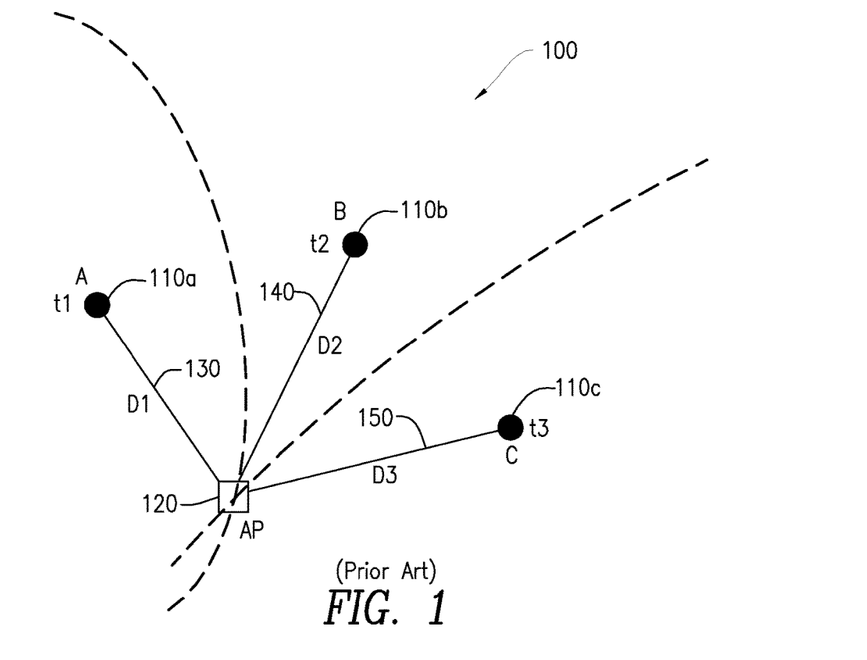
FIG. 1 is a diagram of a typical passive location system consisting of multiple measuring stations.

First, consider the following review of the TDOA method so that differences with the proposed method of the present disclosure can be elucidated. FIG. 1 is a diagram of a typical passive location system 100, which includes three measuring stations 110a, 110b and 110c (referred to collectively herein as "measuring stations 110" or "measuring receivers 110.") The target 120 is a wireless device, such as, for example, an Access Point (AP) that is to be located by the three measuring stations 110. The distance of the AP 120 from receiving station 110a is D1, 130. The distance of the AP 120 from receiving station 110b is D2, 140. The distance of the AP 120 from receiving station 110c is D3, 150. A transmission from the AP 120 is received at each of the three measuring stations 110a, 110b, and 110c, at times t1, t2, and t3 respectively, which are directly related to the distances D1, 130, D2, 140 and D3, 150. If the transmission from the AP 120 is at time T1, then it will be received at a measuring station at time (T1+D/c) where D is the distance of the measuring station from the AP 120, and c is the speed of light. Hence, t1=T1+D1/c, t2=T1+D2/c and t3=T1+D3/c. The TDOA for the measuring stations 110a and 110b is therefore TDOA12=t1−t2=(D1−D2)/c, and the TDOA for the measuring stations 110b and 110c is TDOA23=t2−t3= (D2−D3)/c. The methods for calculating the intersections of the two resulting hyperbolas are well known in the art.

Figure 2:
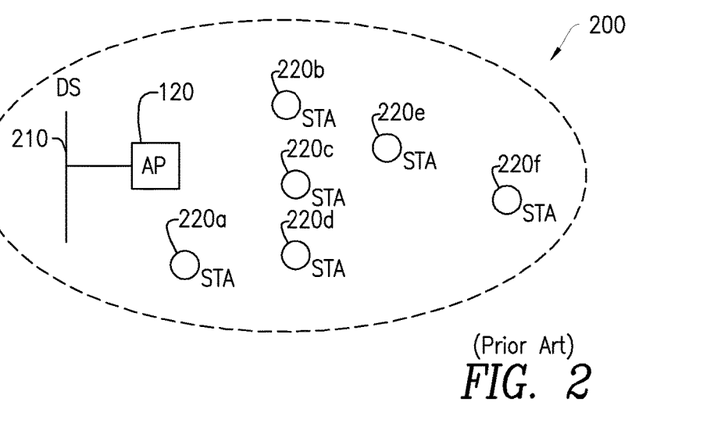
FIG. 2 is a block schematic diagram of a typical IEEE 802.11 infrastructure network.

FIG. 2 is a block schematic diagram of a typical IEEE 802.11 infrastructure network 200. A number of mobile nodes, 220a, 220b, 220c, 220d, 220e and 220f (collectively referred to as "mobile nodes 220") are associated with AP 120 which, in turn, is connected to a hard wired distribution system (DS) 210. In such a network the AP 120 will transmit beacons periodically in order to allow the mobile nodes 220 to locate and identify the network, and will allow the AP 120 to convey information to the mobile nodes 220, in particular the timestamp, beacon interval and capability information.

Figure 3:
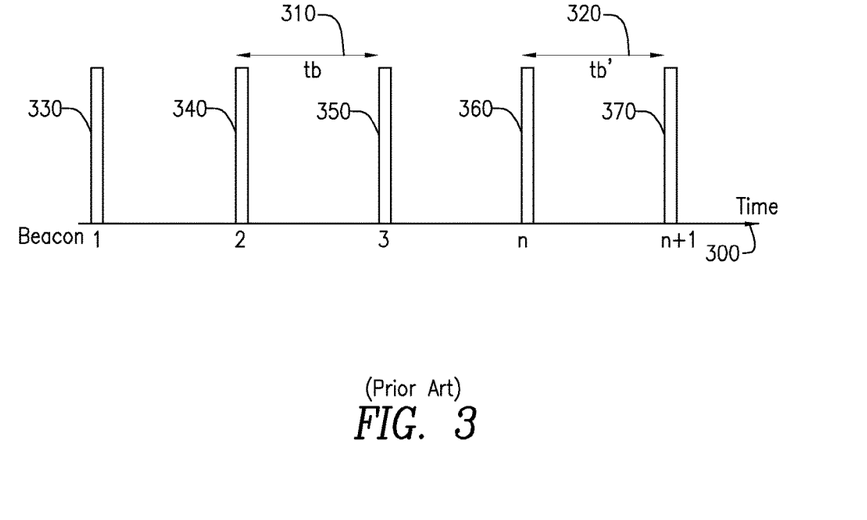
FIG. 3 is a diagram depicting a typical passive location system transmitting a series of beacons over time.

FIG. 3 is a diagram that depicts the transmission of beacons by an AP in an IEEE 802.11 network with respect to the time axis 300. The AP 120 in FIG. 2 will attempt to transmit beacons 330, 340, 350, 360 and 370, at a time interval, tb, 310, known as Target Beacon Transmission time (TBTT). In practice, the time tb' 320 between two beacons may be greater than TBTT. The AP 120 advertises this ideal interval, TBTT, in the beacon frame. The beacon transmission may be delayed beyond TBTT because of other traffic. In addition, because a beacon is never retransmitted, if the reception of the beacon at a station is corrupted for any reason, it is possible that that station may not receive every beacon. A field that is included in the beacon packet and is transmitted within every beacon is the Timestamp which is 64 bits long and contains the value of the AP's synchronization timer at the time that the frame was transmitted. This is known as the timer synchronization function (TSF). In an infrastructure network associated stations will update their own TSF timer with the value of the timer it receives from the AP 120 in the beacon frame, modified by any processing time required to perform the update operation. This way associated stations maintain synchronous timing with the AP 120. In the case that the beacon TOA is being measured by an un-associated measuring station, then the measuring station will not update its timer to synchronize with the AP TSF. A common tolerance for the clock within an AP 120 is about 3 ppm and it is desirable that the clocks of the AP 120 and of the measuring station maintain a constant drift with respect to absolute time, and that the relative drift between the clocks needs to be assessed.

Figure 4A:
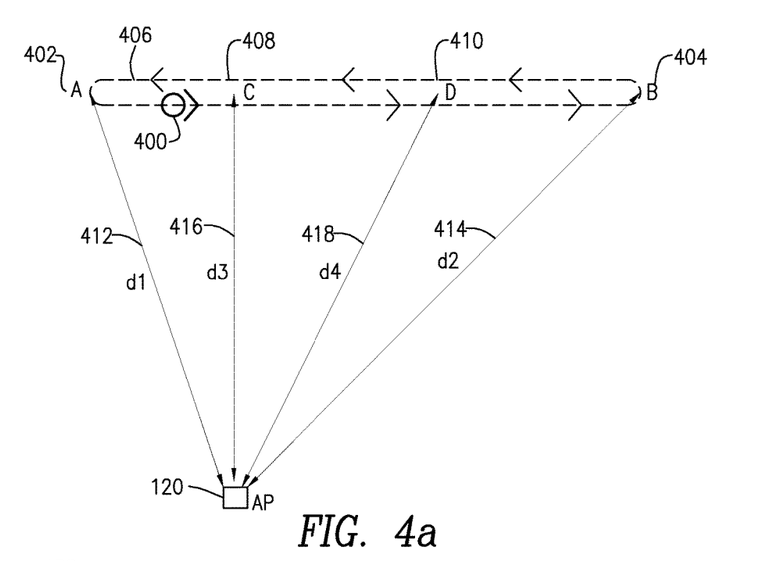
FIG. 4a is a diagram depicting a measuring station moving in a pattern between two points utilizing the principles of the present disclosure.

FIG. 4a, FIG. 4b, FIG. 4c and FIG. 4d describe an exemplary measurement process of the present disclosure and depict a scenario where a measuring receiver or measuring station 400, utilizing the principles of the present disclosure, is moving between points A 402 and B 404 on a path 406. In FIG. 4a, measuring station 400 is moving in a certain path 406 and measuring the TOAs of the beacons from AP 120. In this example, the station 400 starts at position A 402, and then moves to point B 404, via points C 408 and D 410. When the station 400 reaches point B 404, the station 400 reverses and travels back to point A 402, again via points C 408 and D 410. As station 400 moves along the path 406, station 400 is constantly measuring the TOA of the beacons that are transmitted by the AP 120. The distances between the measuring station 400 and the AP 120 when the station 400 is at points A 402, B 404, C 408 and D 410 are d1 412, d2 414, d3 416 and d4 418 respectively. If the time that each beacon is transmitted, the time of departure TOD, is known, then the time of flight TOF of the transmission is TOA-TOD. The TOF of the beacon transmission from AP 120, to the station 400 will be proportional to the distance between the station 400 and the AP 120 at each point. Many different patterns for the measuring station 400 may be used and the pattern depicted by path 406 is just one of many possible patterns.

Figure 4B:
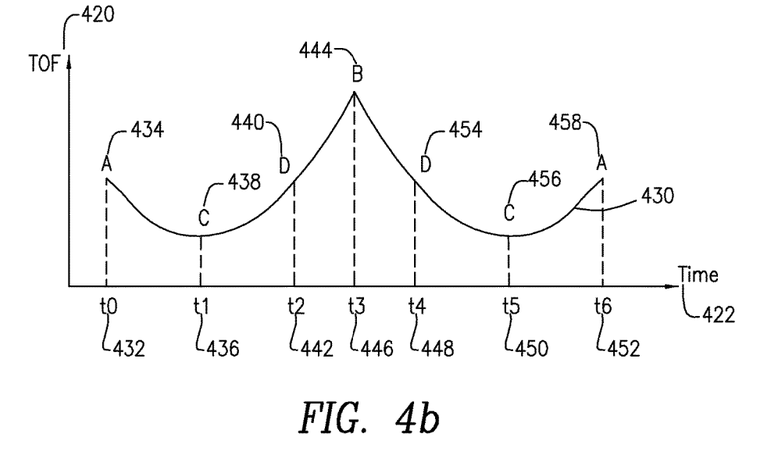
FIG. 4b is a graph depicting the Time of Arrival (TOA) of beacons transmitted by a wireless device utilizing the principles of the present disclosure.

FIG. 4b is a graph 430 depicting the TOF axis 420 of the beacons transmitted by AP 120 as measured by the station 400 against time 422. The station 400 periodically or continuously measures the TOA of the beacons from AP 120 as it moves from position A 402 to position B 404 and back. For the moment assume that the clocks of the AP 120 and the measuring station 400 are perfectly aligned and the TOD of each beacon is known. The resulting graph 430 is the variation of TOF 420 against time 422. The TOA measurements are carried out for every beacon transmission. At time t0 432, the station 400 measures the TOA for point A 402 and calculates TOF 434. At time t1 436, the station 400 measures the TOA for point C 408 and calculates TOF 438. Point C 408, in this example, is closer to the AP 120 than point A 402, and this is shown by TOF 438 which is less than TOF 434. Point D 410 is at a similar distance from the AP 120 as is point A 402 and hence the corresponding TOF 440, measured at time t2 442, is a similar value to TOF 434. Point B 404 is the furthest distance from the AP 120 and hence the TOF 444, measured at time 446 is greater than those measured at times t0 432, t1 436 and t2 442. After time t3 446, the measuring station 400 is moving back from point B 404 towards point A 402 and at times t4 448, t5 450 and t6 452, the TOFs 454, 456 and 458, corresponding to points D 410, C 408 and A 402 are again measured. The graph 430 in FIG. 4b of the measured TOF 420 against time 400 is ideal and assumes that the clocks at the AP 120 and the measuring station 400 are perfectly aligned. In practice this will not be the case and it is necessary for the relative clock drift and offset to be determined.

In the example depicted in FIG. 4a and FIG. 4b, the measuring station 400 periodically or continuously measures the TOAs of the beacons from the AP 120 as it moves along the path 406 and calculates the TOFs. If the TOA measurements and the TOF calculations are accurate, then the time differences between points can be calculated and the location of the AP 120 determined using a formula developed for TDOA location. Several such formulas are well known and this final calculation of the actual location, using the time differences, does not form part of this disclosure. This disclosure is concerned with using the TSF timer in the beacon, the TOA measurement by the measuring station 400 and the elimination of the relative drift and offset between the clocks of the AP 120 and the measuring station 400. In addition, it should be noted that, as defined in the IEEE 802.11 Standard, the TSF field of the beacon is in 1 μs increments. However, the present disclosure is not limited solely to 1 μs increments. One method of measuring the TOA of the beacon at the measuring station 400 is to use the internal TSF timer of the station 400. In this case the TOA time would also be in 1 μs increments. To distinguish between the case where TOAs are recorded simultaneously by measuring stations 400 at several locations, with the scheme that is described in this disclosure, where a single mobile measuring station 400 is used, the term "difference time of arrival" DTOA is used rather than TDOA. It should be noted, however, that the method described in this disclosure may be extended to the use of two or more mobile measuring stations 400 and is not limited to just one.

In consideration that the timer on the AP 120 and the timer on the measuring station 400 are rarely aligned, two terms will be defined, $\alpha$, the offset between the two timers at some time and $\beta$, the relative drift between the two timers. The time that AP 120 transmits its beacon, the TSF time, is included in a field in the beacon transmission packet. Hence, the measuring station 400 that receives the beacon knows the time that the beacon is transmitted, the TOD as measured by the AP's clock. Similarly the time that the beacon was received, TOA, as measured by the measuring receiver's clock, is also known.

For the reception of the first beacon:

$$TOA1 = \alpha + \beta * TOD1 + \delta1 \quad (1)$$

Where $\alpha$ is the offset between the TSF clock in the AP 120 and the clock in the measuring receiver, where $\beta$ is the relative drift between the two clocks and $\delta$ is the time delay due to the distance from the AP 120 to the receiver.

For the nth beacon:

$$TOAn = \alpha + \beta * TODn + \delta n \quad (2)$$

Similarly for the mth beacon:

$$TOAm = \alpha + \beta * TODm + \delta m \quad (3)$$

The value of $\beta$ is determined as:

$$(2)-(3) \quad TOAn - TOAm = \beta(TODn - TODm) + (\delta n - \delta m) \quad (4)$$

Rearranging:

$$\beta = [(TOAn - TOAm) - (\delta n - \delta m)] / (TODn - TODm) \quad (5)$$

In equation (5) the term ($\delta n - \delta m$) is unknown. If, however, the distance from the AP to the measuring receiver is the same at the two points corresponding to TOAn and TOAm, then ($\delta n - \delta m$)=0 and the value for $\beta$ can be determined. The higher the value for (n−m), i.e. the number of beacons between the TOA measurements, then the more accurate the value for $\beta$. For example, in order to measure a relative drift between the AP 120 and the measuring station clocks to an accuracy of 0.1 ppm, requires a time difference of 10 seconds between the TOA measurements, or the transmission of about 100 beacons.

Figure 4C:
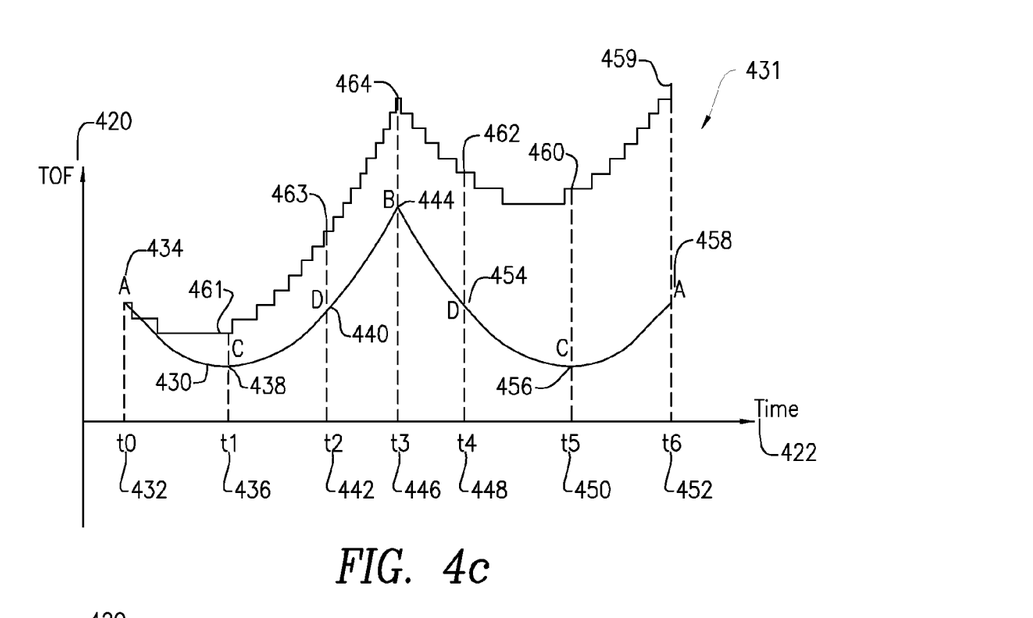
FIG. 4c is the graph depicted in FIG. 4b, including a graph of raw TOA measurements utilizing the principles of the present disclosure.

The graph 431 in FIG. 4c is a re-plot of the graph depicted in FIG. 4b, now allowing the clock on the AP 120 to not be aligned with the clock on the measuring station 400 but where a relative drift $\beta$ of 0.1 ppm exists, and a zero offset a at the start time. Both TSF and TOA times are in increments of 1 μs, and a noiseless propagation environment is assumed. As time increases, the error in the TOF calculation progressively increases due to the 0.1 ppm relative drift between the measuring receiver and the AP clocks. At time t6, 452, when the measuring receiver has returned to point A 402, first visited at time t0 432, the calculated TOF 459 is significantly in error compared to the true TOF 458. This error is directly related to the elapsed time (t6−t0) multiplied by the relative drift of 0.1 ppm. Similarly comparing the pairs of measurements where the receiving station 400 is at the same points, the calculated TOF 460 is larger than TOF 461 for point C 408, at times t5 450 and t1 436; the calculated TOF 462 is larger than TOF 463 for point D 410, at times t4 448 and t2 442; and when the measuring station 400 is at point B 404 the error is shown by the difference in the calculated TOF 464 and the true TOF 444. Of note, in the case that the actual relative drift was, say, 4 ppm, and if the relative drift is corrected to within 0.1 ppm, then there is still a significant error as shown in FIG. 4c. Hence the relative drift between the two clocks must be compensated for as accurately as possible.

Figure 4D:
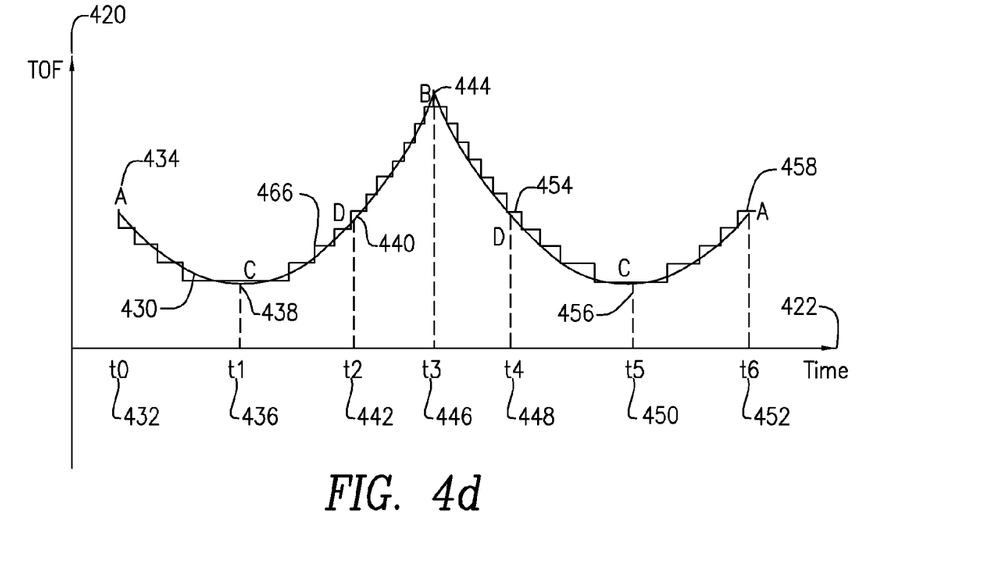
FIG. 4d is the graph depicted in FIG. 4b, including a graph of corrected TOA measurements utilizing the principles of the present disclosure.

FIG. 4d is the graph depicted in FIG. 4b, which again shows the ideal TOF measurements 430, plus a graph of corrected TOF measurements 466, where the relative drift $\beta$ has been reduced to 0.005 ppm, both TOF and TOA times are in increments of 1 μs, and a noiseless propagation environment is assumed. The progressive error as shown in FIG. 4c is reduced significantly in FIG. 4d, demonstrating a desire to determine an accurate value for the relative drift $\beta$. To achieve this degree of accuracy ideally the value for $\beta$ should be calculated using the TOD and TOA readings from beacons that are separated in time by an amount that is as large as practical. Well known mathematical techniques used to determine the location of an emitter using TDOA involve the filtering of the results and reducing the errors using techniques such as least squares. Such techniques in practice allow that the precision for the value of the relative clock drift $\beta$ can be reduced. However, it is fair to state that the better the precision of the value for $\beta$ the better the accuracy of the final location estimate.

An exemplary method proposed in this disclosure is to calculate a value for the relative drift of the AP 120 and measuring receiver clocks, $\beta$, at points where the position of the measuring receiver is close to a previous position where TOA and TSF readings were noted, such that ($\delta n - \delta m$) is approximately equal to zero. The value for β can then be estimated using the time difference between the two TOA measurements and the TOD values as shown in equation (4). The value for β may be updated each time a new calculation is carried out. The updated value may take account of the elapsed times between the measurements, for example the longer the time difference the better the calculated value for β. It should be noted that as the TOD and TOA times may be in increments of 1 μs, and the fact that this is wireless propagation, in practice, there may be a noise component in the order of ±1 μs on each measurement. The errors, however, will tend to be noisy or Gaussian and may be reduced by the mathematical techniques mentioned beforehand. Hence, by using the TOD and TOA times taken at positions that are close to each other, in practice the resulting value for β can be used to provide an accurate estimation for the location of the AP 120. The method described in this disclosure enables the estimation of the location of a target AP 120 using known TDOA formulas but where a single mobile measuring station 400 is used. The mobile measuring station 400 may be located in a ground vehicle, a vessel at sea or on water or in a vehicle that is airborne.

Figure 5:
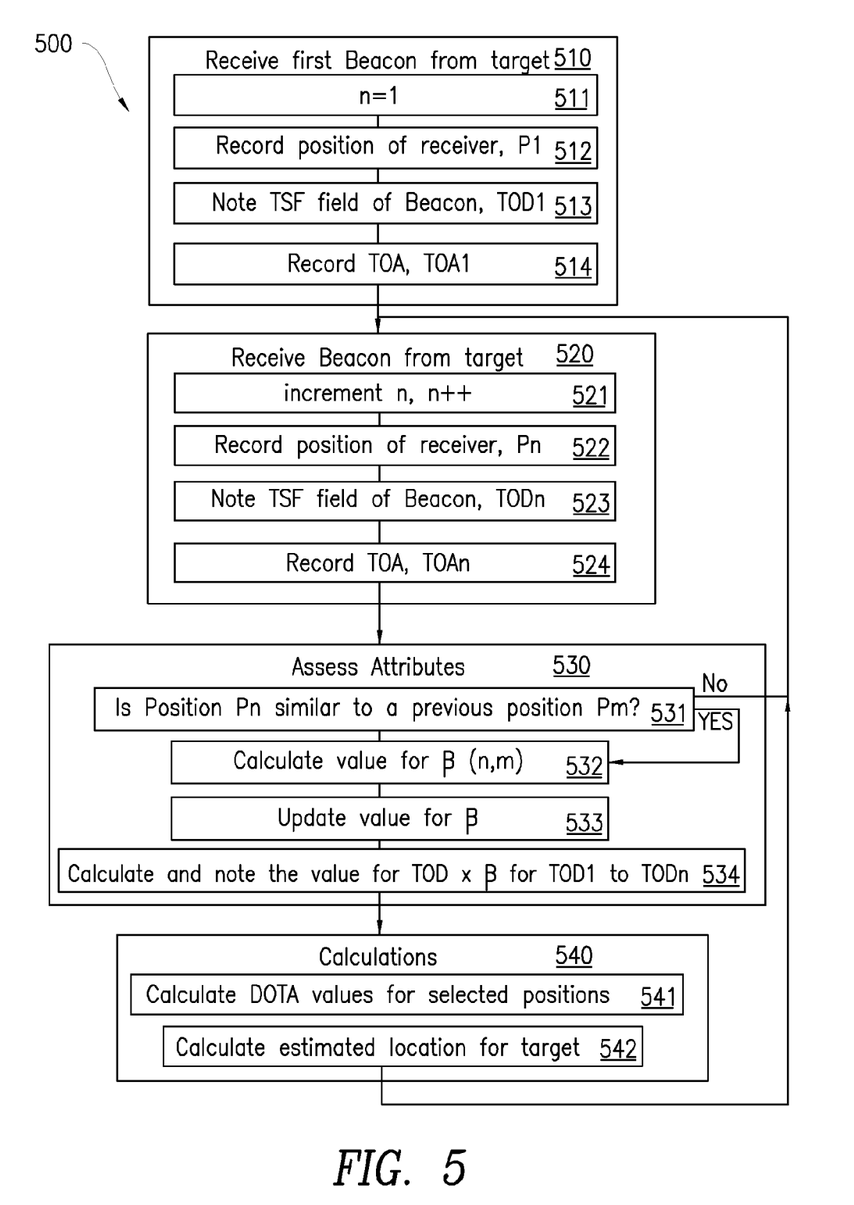
FIG. 5 is a flowchart depicting an exemplary method for locating a wireless device utilizing the principles of the present disclosure.

FIG. 5 illustrates method 500 according to an exemplary embodiment of the disclosure. Method 500 may start by stage 510 with the reception of the first beacon by the measuring receiver 400. Stage 510 may include stage 511 where the beacon reference, n, is initialized. The value of n may be set to 1. Stage 510 may include stage 512 where the position, P1, in space of the measuring receiver 400 is recorded corresponding to the point in time that the beacon was received in stage 510. The position P1 may be obtained by various means such as a GPS receiver, or a navigation system that may be or may not be part of the measuring receiver 400. Stage 510 may also include stage 513 where the value of the TSF field in the received beacon is noted and recorded, TOD1. Stage 510 may also include stage 514 where the value of the TOA of the received beacon, as measured by the measuring station, is noted and recorded, TOA1.

Stage 510 may be followed by stage 520 with the reception of further beacons by the measuring receiver 300. Stage 520 may include stage 521 where the beacon reference n is incremented. Stage 520 may include stage 522 where the position in space, Pn, of the measuring receiver 400 is recorded, corresponding to the point in time that the beacon was received in stage 512 included in stage 510. Stage 520 may include stage 523 where the value of the TSF field in the received beacon is noted and recorded, TODn. Stage 520 may include stage 524 where the value of the time of arrival, TOA, of the received beacon, as measured by the measuring station 300, is noted and recorded, TOAn.

Stage 520 may be followed by stage 530 where the attributes of the received beacon are assessed. Stage 530 may include stage 531 where the position Pn as noted in stage 522 is compared against previously noted positions. If no previously noted position is similar to Pn the stage 531 may be followed by returning to stage 520 and waiting for the next beacon to be received. If a previous position Pm is noted as being similar to Pn then stage 530 may include stage 532 where a value for the relative clock drift β(n,m) is calculated. Positions Pn and Pm need not be identical. The criteria may be that they are be close enough to each other such that a calculation to estimate the relative clock drift β(n,m) may be carried out as described in equation (4) assuming that (δn−δm) is equal to zero. A simple criteria may be to accept positions that are within an acceptable preset distance of each other. A further improvement may be accomplished if an estimate of the direction of the target is known. In this case, a closer inspection of the x, y, and z co-ordinates in space may be used to estimate if the position difference is within certain limits with respect to the direction of the target location. Indeed, the criteria for this stage 531 may change in time as estimates for the actual location for the target improve in confidence and as the precision for the value of β is desired to be greater. For example, in the initial stages, when there is no indication for the location of the target, a simple position difference may be used in order to obtain an initial value for β. For example, the timing of the TSF is in 1 μs time increment and assuming that the timing of the TOA is also in increments of 1 μs, and noting that a 1 μs time increment represents about 300 m in distance, an initial difference in positions of, say, 50 m, may be sufficient to be used as the acceptable position difference in order to trigger a calculation for β.

If in stage 531 the position of the measuring receiver 400, Pn, is deemed to be sufficiently close to a previous position, Pm, then stage 530 may include stage 532 where a value for the relative clock drift, β(n, m) may be calculated. This calculation may be as described in equation (4). Stage 530 may include stage 533 where the value for β may be updated. If a value for β has been previously calculated from previous pairs of TOD and TOA readings, then when a new value of β(n,m) is calculated, in stage 532, the value of β may be updated to a revised value that uses the existing value and the new value β(n,m). Such a revision may be a simple averaging or may use a weighted average if the latest calculation for β is perceived as having a higher precision than previous. The precision may be based upon factors such as time between the pair of readings, the longer the better, and the closeness of the two positions, Pn and Pm, the closer the better. Stage 530 may include stage 534 where the revised or updated value for the relative clock drift β is used to adjust the time values of at least one of the recorded TODs as per formula (2).

Stage 530 may be followed by stage 540 where the calculations are carried out that determine the geo-location estimate. Stage 540 may include stage 541 where the DTOA values for pairs of readings and positions are calculated using, for example, equation (4) above. Stage 540 may include stage 542 where the estimated location of the target is calculated. In one embodiment, the location of the target can include the adjusted values for at least one of the recorded TODs. The mathematical processes used in stage 540 do not form part of this disclosure as they are well known and various.

Figure 6:
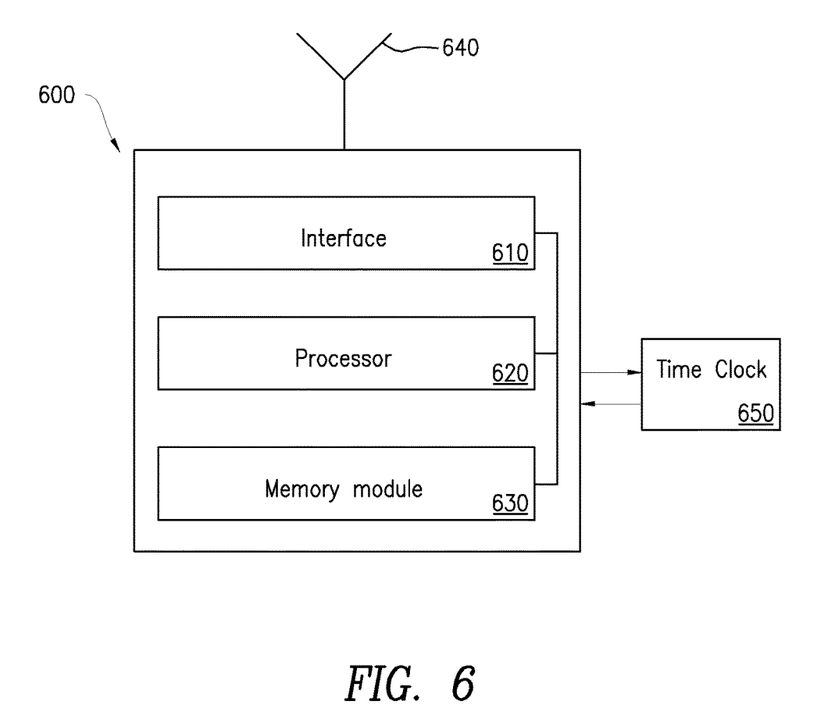
FIG. 6 depicts an exemplary wireless communication device configured to locate a wireless device utilizing the principles of the present disclosure.

FIG. 6 illustrates a wireless communication device 600 according to an embodiment of the disclosure that may be used as the measuring receiver.

The wireless communication device 600 may be any device capable of wirelessly receiving signals and can execute any of the methods described in the present disclosure. It may be a station, an access point, or the like. It may be a wireless device that is based upon the IEEE 802.11 specification. The wireless communication device 600 includes interface 610, processor 620, memory module 630 and one or more wireless antennas such as wireless antennas 640. The wireless communication device 600 may also include a time clock 650. Time clock 650 may be part of the wireless communication device 600 or may be a separate external block. The interface 610 may be a wireless receiver, or a combination of a wireless transmitter and receiver. It may include, for example, at least a part of an analog and/or digital front end of a receiver, a transmitter or a combination thereof.

The interface 610 and/or the processor 620 may include measurement elements for measuring and/or calculating attributes of received signals (input signals, transmissions). The interface 610 and/or the processor 620 may include monitoring elements for monitoring attributes of received signals.

According to an embodiment of the disclosure, the interface 610 is arranged to receive input signals and the processor 620 is arranged to measure and monitor an input signal's attribute, namely the beacon packet transmitted by an access point that is based upon the IEEE 802.11 standard. The memory module may store instructions for executing any method mentioned in herein, input signals, results of processing of the processor 620, signals to be outputted or the like.

According to an embodiment of the disclosure, the interface 610 is arranged to receive transmissions of another wireless communication device and the processor 620 is arranged to monitor an attribute of the beacon transmissions of the other wireless communication device, and determine the value of the TSF field in the beacons of the other wireless communication device. In addition according to an embodiment of the disclosure the interface 610 is arranged to measure the time of arrival of the received beacon transmissions of the other wireless device. This may be accomplished by outputting the value of the TSF timer of the wireless communication device 600 that corresponds to a precise point in time when the beacon was received. This point in time may correspond to the time when the frame check is completed. This point in time may be taken at various other points in the received beacon, for example the time when the clear channel assessment (CCA) of the measurement receiver was exerted by the beacon reception, or the point where the header of the beacon is verified. This timing may also be accomplished by outputting a trigger that is timed to coincide with the reception of the beacon from the other wireless device. This trigger may correspond to any known point within the reception of the beacon. This trigger may then be used to read the time from the time clock 650. Time clock 650 may have a precision that is higher than the internal TSF timer that is part of the wireless communications device 600.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the criteria for accepting positions as being candidates for the calculation of the relative drift between clocks, the methods for updating the drift coefficient β, the details of the measuring receiver, the method of measuring the time of arrival, the use of the internal TSF timer and an external time source to increase the accuracy, the use of more than one measuring receiver. Accordingly the scope should be determined not by the embodiments illustrated, but by the claims and their legal equivalents.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method for determining a location of a wireless device based on receipt of a plurality of received beacons, the method comprising:
   receiving, by a measuring receiver at a first position, a first beacon of the plurality of beacons transmitted to the measuring receiver by the wireless device;
   receiving, by the measuring receiver at a second position, a second beacon of the plurality of beacons transmitted to the measuring receiver by the wireless device; and
   when the first position differs from the second position by less than a predetermined distance:
      determining a relative drift between a clock associated with the wireless device and a clock associated with the measuring receiver, the determining comprising:
         identifying a first Time of Departure (TOD), the first TOD indicating when the wireless device transmitted the first beacon to the measuring receiver according to the clock associated with the wireless device;
         identifying a first Time of Arrival (TOA) of the first beacon at the measuring receiver according to the clock associated with the measuring receiver;
         identifying a second TOD, the second TOD indicating when the wireless device transmitted the second beacon to the measuring receiver according to the clock associated with the wireless device;
         identifying a second TOA of the second beacon at the measuring receiver according to the clock associated with the measuring receiver; and
         using a ratio of a difference between the first TOA and the second TOA and a difference between the first TOD and the second TOD to determine the relative drift;
      determining a location of the wireless device based in part on the determined relative drift, the first beacon including a first timer synchronization function (TSF) field containing the first TOD; and
      outputting the determined location of the wireless device.

2. The method of claim 1, further comprising adjusting at least one of the first TOD and the second TOD according to the determined relative drift.

3. The method of claim 2, wherein determining the location of the wireless device includes the adjusted at least one of the first TOD and the second TOD.

4. The method of claim 1, further comprising revising a previously determined relative drift to arrive at an adjusted relative drift.

5. The method of claim 4, wherein revising the previously determined relative drift to arrive at the adjusted relative drift includes averaging the previously determined relative drift and the determined relative drift.

6. The method of claim 4, further comprising adjusting at least one of the first TOD and the second TOD according to the adjusted relative drift.

7. The method of claim 1, further comprising determining a location of a second wireless device simultaneously with the determining of the location of the wireless device.

8. The method of claim 1, wherein the wireless device is a wireless access point.

9. A measuring receiver for determining a location of a wireless device based on receipt of a plurality of received beacons, the measuring receiver comprising:
   an interface configured to:
      receive, at a first position, a first beacon of the plurality of beacons transmitted to the measuring receiver by the wireless device;
      receive, at a second position, a second beacon of the plurality of beacons transmitted to the measuring receiver by the wireless device; and
   circuitry comprising:
      a processor; and
      a memory storing instructions that, when executed, configure the processor to:
      when the first position differs from the second position by less than a predetermined distance:
         determine a relative drift between a clock associated with the wireless device and a clock associated with the measuring receiver, the determining comprising:
            identify a first Time of Departure (TOD), the first TOD indicating when the wireless device transmitted the first beacon to the measuring receiver according to the clock associated with the wireless device;
            identify a first Time of Arrival (TOA) of the first beacon at the measuring receiver according to the clock associated with the measuring receiver;
            identify a second TOD, the second TOD indicating when the wireless device transmitted the second beacon to the measuring receiver according to the clock associated with the wireless device;
            identify a second TOA of the second beacon at the measuring receiver according to the clock associated with the measuring receiver; and
            use a ratio of a difference between the first TOA and the second TOA and a difference between the first TOD and the second TOD to determine the relative drift;
         determine a location of the wireless device based in part on the determined relative drift, the first beacon including a first timer synchronization function (TSF) field containing the first TOD; and
         output the determined location of the wireless device.

10. The measuring receiver of claim 9, wherein the processor is further configured to adjust at least one of the first TOD and the second TOD according to the determined relative drift.

11. The measuring receiver of claim 10, wherein determining the location of the wireless device includes the adjusted at least one of the first TOD and the second TOD.

12. The measuring receiver of claim 9, wherein the processor is further configured to revise a previously determined relative drift to arrive at an adjusted relative drift.

13. The measuring receiver of claim 12, wherein revising the previously determined relative drift to arrive at the adjusted relative drift includes averaging the previously determined relative drift and the determined relative drift.

14. The measuring receiver of claim 12, wherein the processor is further configured to adjust at least one of the first TOD and the second TOD according to the adjusted relative drift.

15. The measuring receiver of claim 9, wherein the processor is further configured to determine a location of a second wireless device simultaneously with the determining of the location of the wireless device.

16. The measuring receiver of claim 9, wherein the wireless device is a wireless access point.

17. A method for determining a location of a wireless device based on receipt of a plurality of beacons, the method comprising:

receiving, by a measuring receiver, a first beacon, the first beacon including a first timer synchronization function (TSF) field containing a first Time of Departure (TOD), the first TOD indicating when the wireless device transmitted the first beacon to the measuring receiver according to a clock associated with the wireless device;

identifying a first position of the measuring receiver at a time the first beacon was received;

identifying a first Time of Arrival (TOA) of the first beacon at the measuring receiver according to a clock associated with the measuring receiver;

receiving, by the measuring receiver, a second beacon, the second beacon including a second TSF field containing a second TOD, the second TOD indicating when the wireless device transmitted the second beacon to the measuring receiver according to the clock associated with the wireless device;

identifying a second position of the measuring receiver at a time the second beacon was received;

identifying a second TOA of the second beacon at the measuring receiver according to the clock associated with the measuring receiver;

when the second position differs from the first position by less than a predetermined distance:

determining a relative drift between the clock associated with the wireless device and the clock associated with the measuring receiver;

determining a location of the wireless device based in part on the determined relative drift; and         outputting the determined location of the wireless device.

\* \* \* \* \*